Feb. 21, 1950 P. R. SCHROEPPEL 2,498,510
BINDER
Filed July 30, 1942 2 Sheets-Sheet 1

INVENTOR
Paul R. Schroeppel
BY Emerson B. Donnell
atty

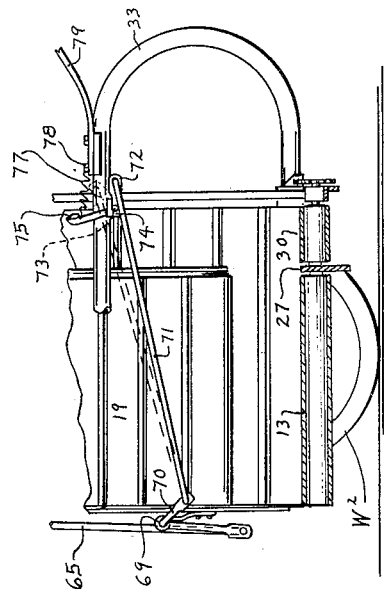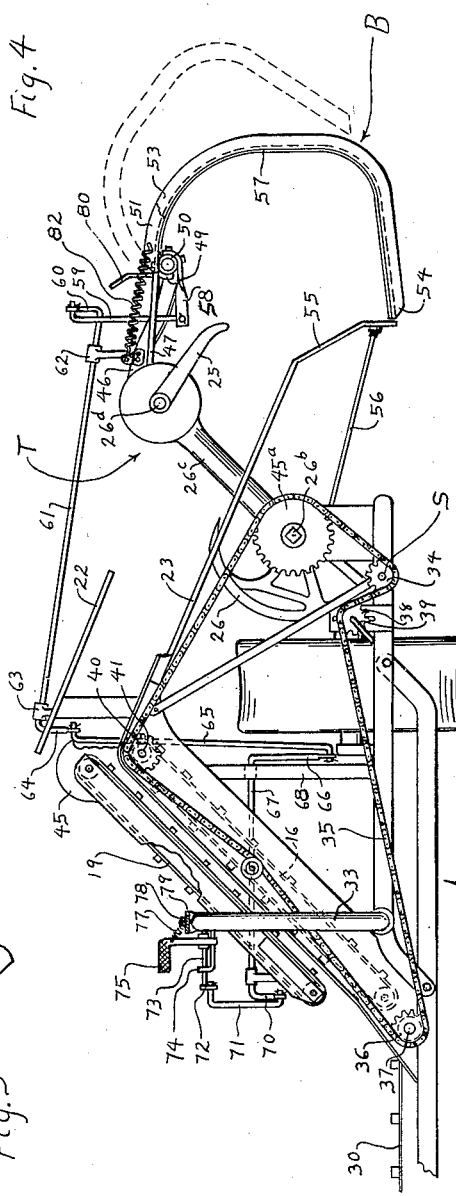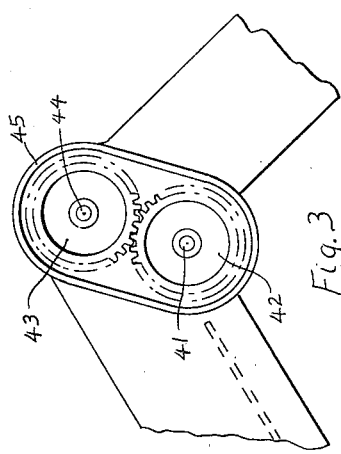

Patented Feb. 21, 1950

2,498,510

UNITED STATES PATENT OFFICE 2,498,510

BINDER

Paul R. Schroeppel, Rockford, Ill., assignor to J. I. Case Company, Racine, Wis., a corporation Application July 30, 1942, Serial No. 452,900

5 Claims. (Cl. 56—131)

The present invention relates to harvesting machinery and more particularly to binders, and an object of the invention is to generally improve the construction and operation of devices of this class. More particularly an object of the invention is to provide an attachment or attachments for a binder which will adapt it for harvesting row crops.

Row crops in general are taller than crops for which a binder is ordinarily designed and adapted, and there is trouble from the stalks or heads extending to the rear of the platform canvas. In the present instance, this difficulty is overcome and an improved bundle carrier is provided as will be seen in the accompanying drawings in which a satisfactory embodiment of the invention is shown. However, it is to be understood that the invention is not limited to the details disclosed but includes all such variations and modifications as fall within the spirit of the invention as herein expressed.

In the drawings, Figure 1, is a plan view with parts broken away, of so much of a binder as is necessary to illustrate the invention.

Fig. 2 is a rear elevation of the same.

Fig. 3 is a front elevation of a portion of the structure indicated in Fig. 1.

Fig. 4 is a vertical sectional view on the line 4—4 of Fig. 1.

Figure 1:
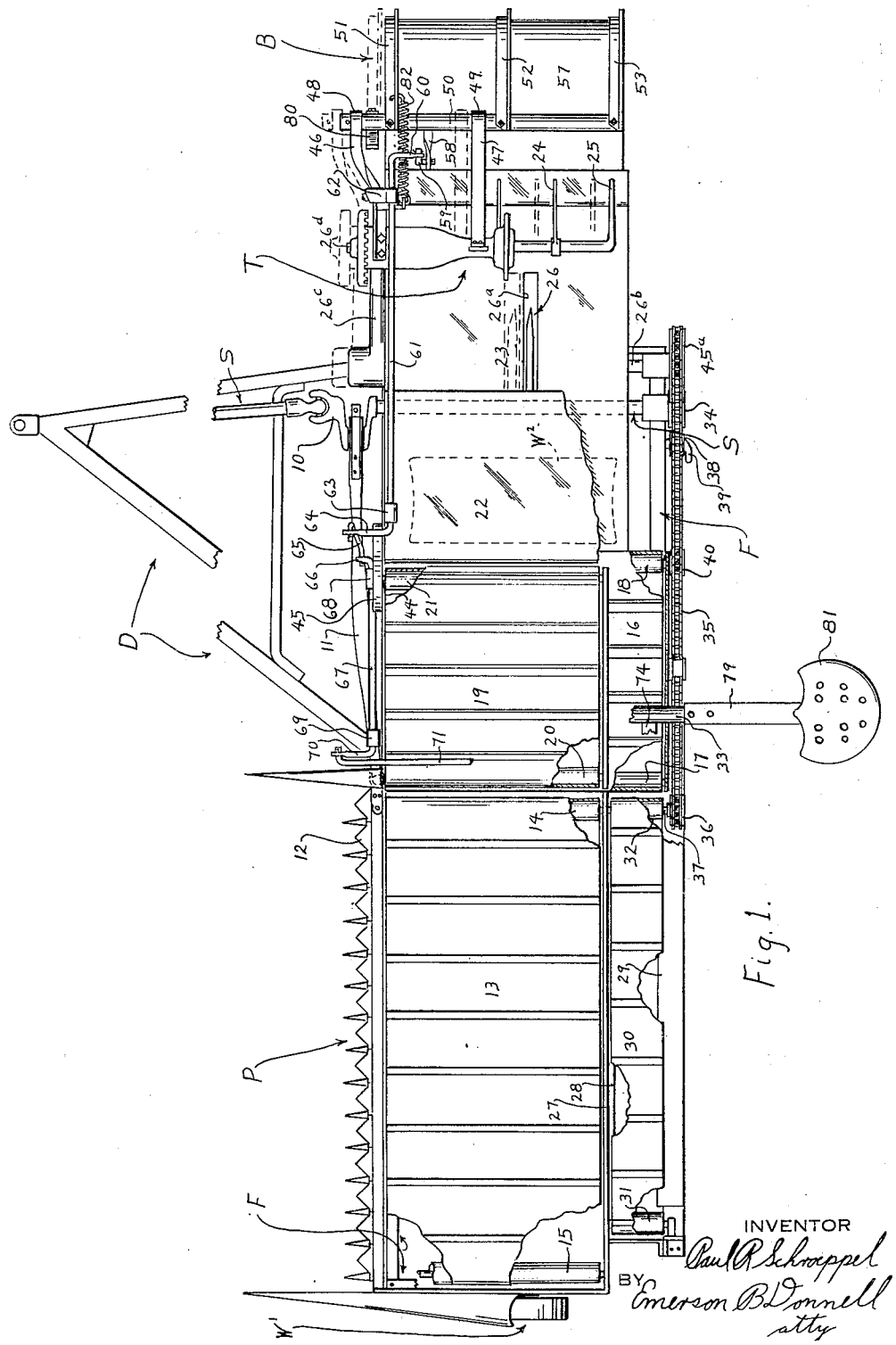

As seen in Fig. 1, the binder comprises a framework generally designated as F composed of suitable metallic or other members fastened together in well-known manner and adapted to support the various elements of the machine in the correct relation with each other as is understood. Such frames being well-known, it is considered unnecessary to describe it further, since it forms no part of the present invention. Frame F is carried on wheels $W^1$ and $W^2$ and supports a platform generally designated as P, a draw bar D, a power shaft S, tying mechanism T, and a bundle carrier B. Binders of this general type being well-known, it is unnecessary to describe the details of the mechanism except to state that power shaft S is actuated in the usual manner from a tractor not shown, connected to draw bar D, and has a cranked portion 10 engaged by a pitman 11 connected to a sickle 12 which is reciprocated by the motion of the pitman in well-known manner. Movement of the binder in the direction indicated results in the cutting of the crop by sickle 12 which crop falls on a canvas conveyor 13 forming part of platform P and traveling on rollers 14 and 15. The cut material is transported to the right as seen in Fig. 1 onto a canvas or elevator 16. Elevator 16 travels on rollers 17 and 18, the several rollers being supported from suitable parts of frame F in well-known manner. The crop is held in contact with elevator 16 by a movable canvas 19 traveling on rollers 20 and 21, also supported in suitable or well-known manner, as by a gooseneck to be later described. The crop is accordingly elevated to a point beneath a member 22 and deposited on a deck 23 where it is engaged by arms 24 and 25 and formed into a bundle. At appropriate times, in well-known manner, a needle generally designated as 26 is passed through a slot $26^a$ in deck 23 and mechanism T ties a cord about the bundle and releases it whereupon it slides on deck 23 into bundle carrier B.

The details of tying mechanism T and needle 26, forming no part of the present invention, they are not described in detail except to state that a shaft $26^b$, Figs. 1 and 2, carries and actuates needle 26 for tying the crop on the binder deck in bundles. A knotter frame $26^c$ is supported from a suitable part of frame F in the usual manner and supports the knotter or tying mechanism T with which needle 26 cooperates in tying the bundles. The knotter includes the usual operating shaft $26^d$ and above mentioned bundle discharge arms 24 and 25.

As stated above, a row crop is commonly too tall for the width of canvas 13 and accordingly the heads of such a crop will extend rearwardly of said canvas and will either be lost or damaged or will clog the machine. In the present instance, a shield 27 is placed at the rear of canvas 13, suitably supported from frame F, and extends downwardly somewhat to intercept stubble behind sickle 12, it being understood that the machine is normally progressing in the direction of draw bar D. Shield 27 supports a pair of guides 28 and 29 on which is arranged a supplemental canvas 30 supported on rollers 31 and 32. Canvas 30 travels in the same direction and substantially at the same speed as canvas 13 so that in effect canvas 30 constitutes a part of canvas 13 and additional space is provided for the taller row crop, it being understood that shield 27 does not project above canvas 13. In the present instance canvas 16 together with above mentioned supporting gooseneck 33 are made of such dimensions as to accommodate the increased capacity of platform P.

Returning to a more detailed description of the invention, shaft S extends to the rear of the machine and in the present instance has a sprocket 34, Fig. 2, driving, through a chain 35 a sprocket 36 on a shaft 37 constituting the axis of above mentioned rollers 14 and 32. Rotation of shaft S accordingly causes rotation of rollers 14 and 32 and conveying motion of canvas 13 and canvas 30. Chain 35, as seen in Fig. 2, passes over an idler 38 adjustable by means of a clamping nut 39 in well-known manner for adjusting the degree of tightness of chain 35. Chain 35 also engages a sprocket 40 on a shaft 41 constituting the axis of above mentioned roller 18. In this manner roller 18 is driven thus propelling elevator canvas 16. A gear 42, Fig. 3, on above mentioned shaft 41, engages and drives a gear 43 on a shaft 44 constituting the axis of roller 21. In this manner, upper canvas 19 is driven so as to urge the grain from above and prevent its sliding back down elevator 16. In the present instance, gears 42 and 43 are enclosed within a casing 45, thus protecting the gears and also the machine operator from injury.

Upon the frame of tying mechanism T are secured brackets 46 and 47, Fig. 1, having bearings 48 and 49 at their ends in which is mounted a rock shaft or pipe element 50 and to which are secured a series of frame members 51, 52 and 53, approximately C-shaped as viewed from the front of the machine so that their lower free ends 54, Fig. 2, turn toward and abut a wall or deflector 55 extending downwardly from deck 23 and preferably braced by a rod or the like 56 to a suitable part of knotter frame 26ᶜ. Frame members 51, 52 and 53 enclose and support as sheet metal or wall portion 57 which, with wall portion 55, constitutes a receptacle into which the bound material discharging from deck 23 will be retained until released.

When sufficient bundles have been accumulated, it is necessary to deposit them upon the ground. This purpose is accomplished by raising the bundle carried substantially to the position shown in dotted lines in Fig. 2, so that the carrier being thus separated from wall 55 provides ample space for the discharge of the bundles. The bundle carrier is then returned to normal position, and this operation is repeated as frequently as required.

For effecting such operation, an arm 58 is secured to rock shaft 50 and pivotally connected to a link 59 extending upwardly to a pivotal connection with an arm 60 extending rearwardly from a transverse rod 61 supported by a standard 62 from above mentioned bracket 46 and also from a standard 63 carried in the present instance on member 22. Rod 61 has an arm 64 extending forwardly and connected by a link 65 with a downwardly extending arm 66 on a transverse rod 67 journaled in a standard 68 carried on an appropriate part of frame F and also in a standard 69 carried on frame F beyond upper elevator canvas 19, as seen in Fig. 2. Rod 67 has an arm 70 extending downwardly and rearwardly and connected by a link 71, Fig. 4, with an arm 72 on a pedal shank 73 rockably mounted in bracket 74 fixed in the present instance with gooseneck 33. A pedal 75 is fixed with shank 73 and pressure on the pedal will cause counterclockwise rotation of shank 73 as seen in Fig. 4.

As will be apparent, arm 72 extends backwardly and, in the downward or closed position of bundle carrier B is located somewhat past dead center as related to link 71. Bundle carrier B therefore cannot be raised by pressure of the load of bundles for the reason that no amount of tension in link 71 can cause forward rotation of pedal 75. Backward rotation of the pedal is prevented by suitable means as a stub portion 76, Fig. 2, engaging bracket 74 and a spring 77 is tensioned between pedal 75 and a nut 78, engaged with a seat spring 79 for securing the latter to gooseneck 33. Initial pressure on pedal 75 rotates arm 72 to an effective position after which further pressure pushes forwardly on link 71 and, through the other described linkage, rotates bundle carrier B to the open position, shown in dotted lines indicated in Fig. 2. To prevent excessive opening movement of bundle carrier B, a stop 80 is fixed with rock shaft 50 and, upon negotiation of the desired movement, encounters bracket 46 and prevents further opening of the bundle carrier.

A seat 81 of suitable type, Fig. 1, is secured to seat spring 79 in convenient position for actuating pedal 75 and the several other controls not shown.

Bundle carrier B is of substantial weight and, in order to lighten the burden of lifting it for dumping the load, an assisting spring 82, Fig. 2, is tensioned between a portion of bracket 46 and above mentioned frame member 51. As indicated in Fig. 2, the pull of spring 82 is very closely in line with the center of rock shaft 50, but as bundle carrier B is raised, the distance from rock shaft 50 of the application of the pull increases. Thus as the tension in the spring is relaxed, the leverage at which the tension is exerted is increased so that the assistance rendered to the actuation of pedal 75 does not diminish as the raising movement progresses. In fact, it may increase if desired.

The operation of the above improvement is thought to be clear from the description, and what is claimed as new and desired to be secured by Letters Patent of the United States is:

1. In a bundle carrier for use with a binder, having a platform, a canvas and a sickle, an additional canvas for widening the platform for tall crops and located at the rear of the main canvas, and a tying mechanism movable forward and back to accommodate different heights of crop the combination of a frame work supported from said tying mechanism, a sheet metal covering for said frame work providing a closed bundle carrier, a foot lever connected for raising said bundle carrier for empting the same, a linkage for communicating the motion of said foot lever to the bundle carrier, said linkage having a portion adapted to move past center for locking the bundle carrier in carrying position, and an assisting spring connected with the bundle carrier at a point such that the leverage of said spring tending to raise said carrier increases as said carrier is lifted, and said bundle carrier being movable with said tying mechanism whereby to be in position to effectively collect bundles of the particular length for which said tying mechanism is adjusted.

2. In a bundle carrier for use with a binder, having a platform, a canvas and a sickle, the combination of a frame work supported from said binder, a sheet metal covering for said frame work providing a closed bundle carrier, a foot lever for raising said bundle carrier for emptying the same, a linkage for communicating the motion of said foot lever to the bundle carrier, said linkage having a portion adapted to move past center for locking the bundle carrier in carrying position and an assisting spring connected with the bundle carrier at a point such that the leverage of said spring tending to raise said carrier increases as said carrier is lifted.

3. In a bundle carrier for use with a binder having a platform including a canvas and a sickle, an additional canvas for widening the platform for tall crops at the rear of the main canvas, the combination of a frame work supported on the binder, a sheet metal covering for said frame work providing a closed bundle carrier for the binder, a linkage connected for raising said bundle carrier for emptying the same, said linkage having a portion adapted to move past center for locking the bundle carrier in carrying position, and an assisting spring connected with the bundle carrier at a point such that the leverage of said spring tending to raise said carrier increases as said carrier is lifted.

4. In a bundle carrier for use with a binder having a platform including a canvas and a sickle, and an additional canvas for widening the platform for tall crops at the rear of the main canvas, the combination of a bundle carrier supported on the binder, means for raising the bundle carrier for releasing material collected thereby, and an assisting spring connected with the bundle carrier for assisting in raising the same.

5. A bundle carrier for a binder, including a tying mechanism movable forward and back for accommodating different heights of crop, said bundle carrier comprising a frame work supported from said tying mechanism, a sheet metal covering for said frame work providing a closed bundle carrier, a foot lever connected for raising said bundle carrier for emptying the same, a linkage for communicating the motion of said foot lever to the bundle carrier, said linkage having a portion adapted to move past center for locking the bundle carrier in carrying position, and an assisting spring connected with the bundle carrier at a point such that the leverage of said spring tending to raise said carrier increases as said carrier is lifted, and said bundle carrier being movable with said tying mechanism whereby to be in position to effectively collect bundles of the particular length for which said tying mechanism is adjusted.

PAUL R. SCHROEPPEL.

REFERENCES CITED

The following references are of record in the file of this patent:

UNITED STATES PATENTS

| Number | Name | Date |
|---|---|---|
| 282,942 | Worthington | Aug. 7, 1883 |
| 290,716 | Steiner | Dec. 25, 1883 |
| 311,550 | Whiteley | Feb. 3, 1885 |
| 361,976 | Baker | Apr. 26, 1887 |
| 361,977 | Baker | Apr. 26, 1887 |
| 473,300 | Deering | Apr. 19, 1892 |
| 571,073 | Miller | Nov. 10, 1896 |
| 637,215 | Pitkin | Nov. 14, 1899 |
| 640,599 | Steward et al. | Jan. 2, 1900 |
| 1,279,542 | Hendricks | Sept. 24, 1918 |
| 1,326,192 | Hanna | Dec. 30, 1919 |